(12) United States Patent  
Qiao et al.

(10) Patent No.: US 11,364,485 B2
(45) Date of Patent: Jun. 21, 2022

(54) MULTI-REGION CATALYSTS FOR CNG ENGINE EXHAUST GAS TREATMENTS WITH IMPROVED AMMONIA LEAKAGE CONTROL

(71) Applicant: JOHNSON MATTHEY (SHANGHAI) CHEMICALS LIMITED, Shanghai (CN)

(72) Inventors: Dongsheng Qiao, Shanghai (CN); Jingwen Wang, Shanghai (CN); Xiang Zheng, Shanghai (CN)

(73) Assignee: Johnson Matthey (Shanghai) Chemicals Co. Ltd., Shanghai (CN)

( * ) Notice: Subject to any disclaimer, the term of this patent is extended or adjusted under 35 U.S.C. 154(b) by 0 days.

(21) Appl. No.: 17/301,737

(22) Filed: Apr. 13, 2021

(65) Prior Publication Data

US 2021/0331142 A1    Oct. 28, 2021

Related U.S. Application Data

(60) Provisional application No. 63/027,990, filed on May 21, 2020.

(30) Foreign Application Priority Data

Apr. 24, 2020   (CN) .......................... 202010332039.9

(51) Int. Cl.  
*B01J 23/10* (2006.01)  
*B01J 23/44* (2006.01)  
(Continued)

(52) U.S. Cl.  
CPC ............ *B01J 23/44* (2013.01); *B01D 53/945* (2013.01); *B01D 53/9454* (2013.01);  
(Continued)

(58) Field of Classification Search  
CPC .... B01D 2255/9025; B01D 2255/9022; B01D 2255/1023; B01D 2255/9032;  
(Continued)

(56) References Cited

U.S. PATENT DOCUMENTS

2020/0102868 A1   4/2020  Fujimori et al.

FOREIGN PATENT DOCUMENTS

CN   109261200 A    1/2019  
EP    1146952 A1    10/2001  
(Continued)

*Primary Examiner* — Timothy C Vanoy  
(74) *Attorney, Agent, or Firm* — Ni Yan (57) ABSTRACT

A three-way catalyst article, and its use in an exhaust system for compressed natural gas engines, is disclosed. The catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first PGM component; and a second catalytic region beginning at the inlet end, wherein the second catalytic region comprises a second PGM component; wherein the first PGM component comprises palladium, platinum, or a combination thereof; and wherein the second PGM component comprises rhodium.

20 Claims, 5 Drawing Sheets

(51) Int. Cl.
  B01J 23/46 (2006.01)
  B01J 35/00 (2006.01)
  B01J 37/03 (2006.01)
  B01J 37/08 (2006.01)
  B01D 53/94 (2006.01)
  F01N 3/10 (2006.01)
  F01N 3/28 (2006.01)
  F02B 43/10 (2006.01)

(52) U.S. Cl.
  CPC ............. B01J 23/10 (2013.01); B01J 23/464 (2013.01); B01J 35/0006 (2013.01); B01J 35/0026 (2013.01); B01J 37/038 (2013.01); B01J 37/082 (2013.01); F01N 3/101 (2013.01); F01N 3/2803 (2013.01); F02B 43/10 (2013.01); B01D 2255/1023 (2013.01); B01D 2255/1025 (2013.01); B01D 2255/904 (2013.01); B01D 2255/908 (2013.01); B01D 2255/9022 (2013.01); B01D 2255/9025 (2013.01); B01D 2255/9032 (2013.01); F01N 2370/02 (2013.01); F01N 2510/06 (2013.01)

(58) Field of Classification Search
  CPC .......... B01D 53/9454; B01D 2258/018; B01D 2255/908; B01D 53/9445; B01D 2255/1021; B01D 53/945; B01D 2255/1025; B01D 2255/904; B01J 23/63; B01J 23/44; B01J 37/0215; B01J 23/10; B01J 23/464; B01J 2523/3712; B01J 2523/48; B01J 2523/822; B01J 2523/25; B01J 2523/824; F01N 2510/06; F01N 3/101; F01N 2510/0684; Y02T 10/12
  See application file for complete search history.

(56) References Cited

FOREIGN PATENT DOCUMENTS

| | | | | |
|---|---|---|---|---|
| EP | 3170553 A2 | 5/2017 | | |
| EP | 3356658 A1 | 8/2018 | | |
| EP | 3 733 289 A1 * | 11/2020 | ............. | B01J 37/28 |
| WO | 2014116897 A1 | 7/2014 | | |
| WO | WO 2017 159 628 A1 * | 9/2017 | ........... | F01N 3/2839 |
| WO | 201811552 A1 | 1/2018 | | |
| WO | WO 2020 195 777 A1 * | 10/2020 | ............ | B01J 37/038 |

* cited by examiner

MULTI-REGION CATALYSTS FOR CNG ENGINE EXHAUST GAS TREATMENTS WITH IMPROVED AMMONIA LEAKAGE CONTROL

FIELD OF THE INVENTION

The present invention relates to a catalyzed article useful in treating exhaust gas emissions from compressed natural gas (CNG) engines.

BACKGROUND OF THE INVENTION

Compressed natural gas (CNG) is composed of simple hydrocarbons, primarily methane, which leads to much lower $CO_2$ generation produced per unit of energy, and CNG has been used as one clean energy alternative to the conventional gasoline and diesel fuel. Besides this, CNG is also preferred in the market due to its abundance in the supply and the relatively lower price, therefore in recent years, CNG engines have attracted increasing attention in the auto market, especially for the heavy-duty vehicle which operating with a CNG engine operating under the stoichiometric calibration. Even operating under CNG, automotive exhaust emission is inevitable, which usually consists of the typical pollutants like hydrocarbons (HCs), carbon monoxide (CO) and nitrogen oxides ("$NO_x$"), and the traditional gasoline emission catalyst, three-way catalysts (TWC) are usually applied for the exhaust emissions control from the CNG engine, while ammonia ($NH_3$) is recognized as a by-product during the operation of three-way catalyst (TWC) over a stoichiometric CNG engine which will bring new pollutant emission problems, such as the formation of secondary inorganic aerosols leading to the degradation of air quality. So, it has been attempted to get ammonia emission under the control by means of an ammonia slip catalyst (ASC), which is also a typical emission control approach in heavy duty diesel aftertreatment systems.

Despite advances of the catalyst for a stoichiometric CNG engine antitreatment system, the ammonia leakage control is usually through an oxidation catalyst or an oxidation catalyst combined with a selective catalytic reduction (SCR) function that comprises a molecular sieve zeolite as support material in the catalyst design, such as those described in CN109261200 and WO201811552. There are, however, few efforts aim to solve the ammonia emission problem for the stoichiometric CNG engine over a TWC design without any molecular sieve zeolite containing oxidation catalyst or SCR function catalyst in the design for $NH_3$ slip control. In order to meet the increasingly stringent emission legislation (such as $NH_3$<10 ppm for China VI legislation on heavy-duty CNG engines), as a result, reducing $NH_3$ emission is also a system emission challenge and needs to be paid close attention. This work brings a new approach in the catalyst design, it can not only convert the typical pollutions control like HC, CO, $NO_x$, but also simultaneously provide solutions for ammonia leakage control through a novel and optimized TWC design with a multi catalytic regions as described in this invention.

SUMMARY OF THE INVENTION

One aspect of the present disclosure is directed to a catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first PGM component; and a second catalytic region beginning at the inlet end, wherein the second catalytic region comprises a second PGM component; wherein the first PGM component comprises palladium, platinum, or a combination thereof; and wherein the second PGM component comprises rhodium.

The invention also encompasses an exhaust system for the CNG engines that comprises the catalyst article of the invention.

The invention also encompasses treating an exhaust gas from a CNG engine, in particular for treating exhaust gas from a stoichiometric CNG engine. The method comprises contacting the exhaust gas with the catalyst article of the invention.

BRIEF DESCRIPTION OF THE DRAWINGS

FIG. 4 shows one embodiment according to the present invention, the first catalytic region extends less than 100% of the axial length L, from the outlet end; the second catalytic region extends less than 100% of the axial length L, from the inlet end. The total length of the second and the first catalytic region can be less than, equal to, or greater than the axial length L. The third catalytic region extends less than 100% of the axial length L, from the inlet end; the fourth catalytic region extends less than 100% of the axial length L, from the outlet end. The total length of the third and the fourth catalytic region can be less than, equal to, or greater than the axial length L. The first and second catalytic regions constitutes bottom layer; and the third and fourth catalytic regions constitutes top layer.

DETAILED DESCRIPTION OF THE INVENTION

The present invention is directed to the catalytic treatment of combustion exhaust gas, such as that produced by stoichiometric CNG engines, and to related catalytic articles and systems. More specifically, the invention relates the suppression of ammonia emission and simultaneous treatment of NO$_x$, CO, HC in a vehicular exhaust system. The processes of the present invention also reduce processing time and lower costs of the catalyst.

One aspect of the present disclosure is directed to a catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first PGM component; and a second catalytic region beginning at the inlet end, wherein the second catalytic region comprises a second PGM component; wherein the first PGM component comprises palladium, platinum, or a combination thereof; and wherein the second PGM component comprises rhodium.

First Catalytic Region

The first PGM component can be selected from the group consisting of platinum (Pt), palladium (Pd), rhodium (Rh), and a combination thereof. In some embodiments, the first PGM component can be Pd, Pt, or a mixture thereof. In other embodiments, the first PGM component can be Pd. In yet other embodiments, the first PGM component can be Pd and Rh; or Pt, Pd, and Rh. In certain embodiments, the first PGM component can be Pt and Rh.

When the first PGM component comprises Pd, the first catalytic region can comprise 0.1-300 g/ft$^3$ of palladium. Preferably, the first catalytic region can comprise 10-200 g/ft$^3$ of palladium, more preferably, 20-150 g/ft$^3$ of palladium.

The first catalytic region can further comprise a first oxygen storage capacity (OSC) material, a first alkali or alkaline earth metal component, and/or a first inorganic oxide.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first inorganic oxide is preferably an oxide of Groups 2, 3, 4, 5, 13 and 14 elements. The first inorganic oxide is preferably selected from the group consisting of alumina, zirconia, magnesia, silica, lanthanum, neodymium, praseodymium, yttrium oxides, and mixed oxides or composite oxides thereof. Particularly preferably, the first inorganic oxide is alumina, lanthanum-alumina, zirconia, or a magnesia/alumina composite oxide. Even more preferably, the first inorganic oxide is alumina, a lanthanum/alumina composite oxide, or a magnesia/alumina composite oxide. One especially preferred first inorganic oxide is alumina or lanthanum-alumina.

The first OSC material and the first inorganic oxide can have a weight ratio of no greater than 10:1, preferably, no greater than 8:1 or 5:1, more preferably, no greater than 4:1, most preferably, no greater than 3:1.

Alternatively, the first OSC material and the first inorganic oxide can have a weight ratio of 10:1 to 1:10, preferably, 8:1 to 1:8; more preferably, 5:1 to 1:5; and most preferably, 4:1 to 1:4.

The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

In some embodiments, the first catalytic region can extend for 20 to 99%, 40 to 99%, or 50-99% of the axial length L. Alternatively, the first catalytic region can extend for 30 to 90 percent of the axial length L. Preferably, for 40 to 90 percent, more preferably, 50 to 90 percent of the axial length L, (E.g., see FIGS. 2a, 2b, 2d, 2e, 3a-3g, and 4).

Alternatively, the first catalytic region can be no greater than 99%, 95%, 90%, or 85% of the axial length L The total washcoat loading of the first catalytic region can be less than 3.5 $g/in^3$, preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.5 $g/in^3$.

Second Catalytic Region

The second PGM component can further comprise platinum, palladium, or a mixture thereof. In some embodiments, the second PGM component can be Pd and Rh. In other embodiments, the second PGM component can be Pt and Rh.

In some embodiments, the second catalytic region is substantially free of PGM metals other than rhodium. In further embodiments, the second catalytic region is essentially free of PGM metals other than rhodium.

The second catalytic region can further comprise a second oxygen storage capacity (OSC) material, a second alkali or alkaline earth metal component, and/or a second inorganic oxide.

The second catalytic region can comprise up to 25 $g/ft^3$ of rhodium. Preferably, the second catalytic region can comprise 1-20 $g/ft^3$, more preferably, 3-15 $g/ft^3$ of rhodium.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia dioxide to ceria dioxide at least 50:50, preferably, higher than 60:40, more preferably, higher than 65:35. Alternatively, the ceria-zirconia mixed oxide also can have a weight ratio of ceria dioxide to zirconia dioxide less than 50:50, preferably, less than 40:60, more preferably, less than 35:65.

The second OSC material (e.g., ceria-zirconia mixed oxide) can be from 10 to 90 wt. %, preferably, 20-90 wt. %, more preferably, 30-90 wt. %, based on the total washcoat loading of the second catalytic region.

The second OSC material loading in the second catalytic region can be less than 2 $g/in^3$. In some embodiments, the second OSC material loading in the second catalytic region is no greater than 1.5 $g/in^3$, 1.2 $g/in^3$, 1 $g/in^3$, 0.8 $g/in^3$, or 0.7 $g/in^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

In some embodiments, the second catalytic region is substantially free of the second alkali or alkaline earth metal. In further embodiments, the second catalytic region is substantially free of, or does not comprise, the second alkali or alkaline earth metal.

The second inorganic oxide is preferably an oxide of Groups 2, 3, 4, 5, 13 and 14 elements. The second inorganic oxide is preferably selected from the group consisting of alumina, zirconia, magnesia, silica, lanthanum, yttrium, neodymium, praseodymium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1, preferably, no greater than 8:1, more preferably, no greater than 5:1, most preferably, no greater than 4:1.

Alternatively, the second OSC material and the second inorganic oxide can have a weight ratio of 10:1 to 1:10, preferably, 8:1 to 1:8; more preferably, 5:1 to 1:5; and most preferably, 4:1 to 1:4.

The second catalytic region can extend for 100 percent of the axial length L. (E.g., see FIGS. 2b and 3b). In some embodiments, the second catalytic region can extend for 20 to 99%, 40 to 99%, or 50-99% of the axial length L. Alternatively, the second catalytic region can extend for 30 to 90 percent of the axial length L; preferably, 40 to 90 percent; more preferably, 45 to 85 percent of the axial length L, (E.g., see FIGS. 2a, 2d, 2e, 3a, 3c-3g, and 4).

Alternatively, the second catalytic region can be no greater than 99%, 95%, 90%, or 85% of the axial length L.

Preferably, the total length of the second region and the first region is equal or greater than the axial length L.

The second catalytic region can overlap with the first catalytic region for 0.1 to 99 percent; preferably, 5 to 90 percent; more preferably, 40 to 80 percent of the axial length L. Alternatively, the total length of the second catalytic region and the first catalytic region can equal to the axial length L. In yet another alternative, the total length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

The total washcoat loading of the second catalytic region can be less than 3.5 g/in$^3$, preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be palladium, rhodium or a mixture thereof. In another embodiments, the third PGM component can be platinum, rhodium or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia dioxide to ceria dioxide at least 50:50, preferably, higher than 60:40, more preferably, higher than 65:35. Alternatively, the ceria-zirconia mixed oxide also can have a weight ratio of ceria dioxide to zirconia dioxide less than 50:50, preferably, less than 40:60, more preferably, less than 35:65.

The third OSC material (e.g., ceria-zirconia mixed oxide) can be from 10 to 90 wt. %, preferably, 25-75 wt. %, more preferably, 30-60 wt. %, based on the total washcoat loading of the third catalytic region.

The third OSC material loading in the third catalytic region can be less than 1.5 g/in$^3$. In some embodiments, the third OSC material loading in the second catalytic region is no greater than 1.2 g/in$^3$, 1.0 g/in$^3$, 0.9 g/in$^3$, 0.8 g/in$^3$, or 0.7 g/in$^3$.

The total washcoat loading of the third catalytic region can be less than 3.5 g/in$^3$, preferably, no more than 3.0 g/in$^3$, 2.5 g/in$^3$, or 2 g/in$^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

In some embodiments, the third catalytic region is substantially free of the third alkali or alkaline earth metal. In further embodiments, the third catalytic region is substantially free of, or does not comprise, the third alkali or alkaline earth metal.

The third inorganic oxide is preferably an oxide of Groups 2, 3, 4, 5, 13 and 14 elements. The third inorganic oxide is preferably selected from the group consisting of alumina, zirconia, magnesia, silica, lanthanum, neodymium, praseodymium, yttrium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1, preferably, no greater than 8:1 or 5:1, more preferably, no greater than or 5:1, most preferably, no greater than 4:1.

Alternatively, the third OSC material and the third inorganic oxide can have a weight ratio of 10:1 to 1:10, preferably, 8:1 to 1:8 or; more preferably, 5:1 to 1:5 or; and most preferably, 4:1 to 1:4.

Figure 3A:
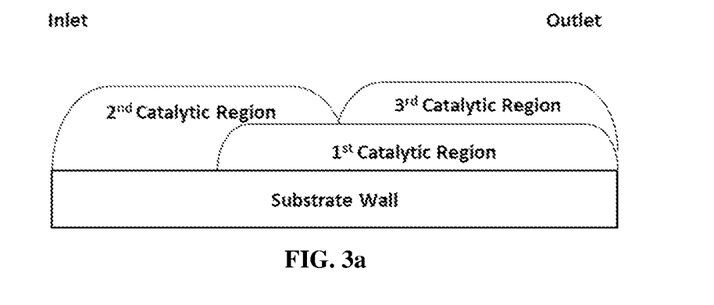
FIG. 3a shows one embodiment according to the present invention, the first catalytic region extends less than 100% of the axial length L, from the outlet end; the second catalytic region extends less than 100% of the axial length L, from the inlet end. The total length of the second and the first catalytic region is greater than the axial length L. The $3^{rd}$ catalytic region extends less than 100% of the axial length L, from the outlet end.
Figure 3B:
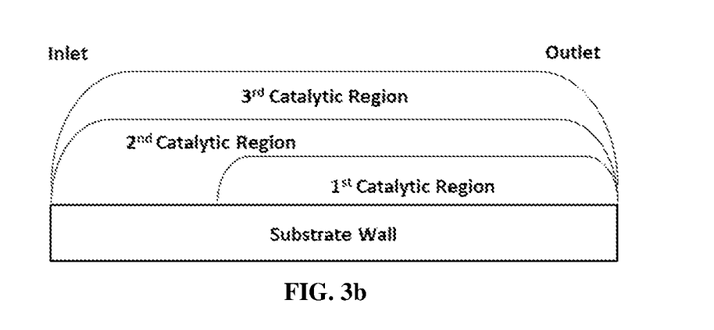
FIG. 3b shows one embodiment according to the present invention, the first catalytic region extends less than 100% of the axial length L, from the outlet end; the second catalytic region extends 100% of the axial length L, covers the first catalytic region. The 3$^{rd}$ catalytic region extends 100% of the axial length L and overlies the first and second catalytic regions as top layer.
Figure 3C:
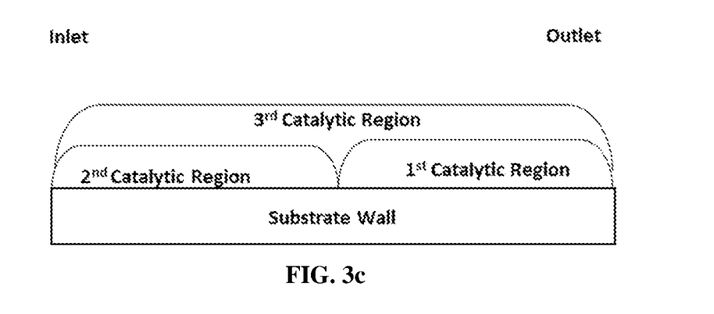
FIG. 3c shows one embodiment according to the present invention, the first catalytic region extends less than 100% of the axial length L, from the outlet end; the second catalytic region extends for less than 100% of the axial length L, form the inlet end. The total length of the second and the first catalytic region is equal or less than the axial length L. The 3$^{rd}$ catalytic region extends 100% of the axial length L and overlies the first and second catalytic regions as top layer.
Figure 3D:
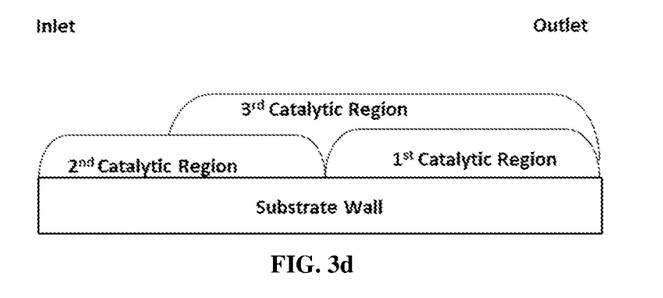
FIG. 3d shows one embodiment according to the present invention, the first catalytic region extends less than 100% of the axial length L, from the outlet end; the second catalytic region extends for less than 100% of the axial length L, form the inlet end. The total length of the second and the first catalytic region is equal or less than the axial length L. The third catalytic region extends less than 100% of the axial length L, from outlet end.
Figure 3E:
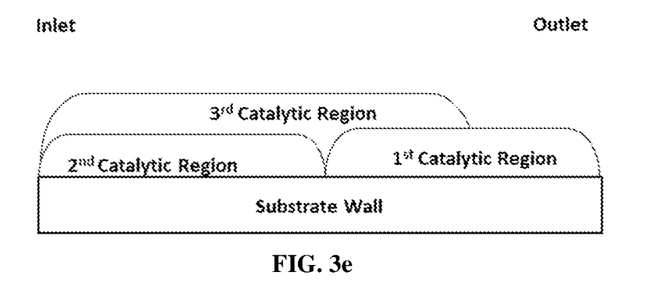
FIG. 3e shows one embodiment according to the present invention, the first catalytic region extends less than 100% of the axial length L, from the outlet end; the second catalytic region extends for less than 100% of the axial length L, form the inlet end. The total length of the second and the first catalytic region is equal or less than the axial length L. The 3$^{rd}$ catalytic region extends less than 100% of the axial length L, from the inlet end.
Figure 3F:
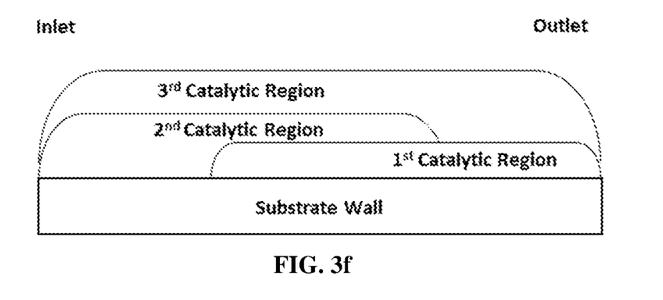
FIG. 3f shows one embodiment according to the present invention, the first catalytic region extends less than 100% of the axial length L, from the outlet end; the second catalytic region extends for less than 100% of the axial length L, form the inlet end. The total length of the second and the first catalytic region is greater than the axial length L. The 3$^{rd}$ catalytic region extends 100% of the axial length L and overlies the first and second catalytic regions as top layer.
Figure 3G:
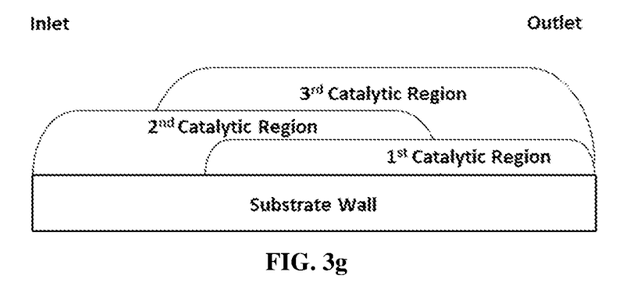
FIG. 3g shows one embodiment according to the present invention, the first catalytic region extends less than 100% of the axial length L, from the outlet end; the second catalytic region extends for less than 100% of the axial length L, form the inlet end. The total length of the second and the first catalytic region is greater than the axial length L. The third catalytic region extends less than 100% of the axial length L, from the outlet end.
Figure 4:
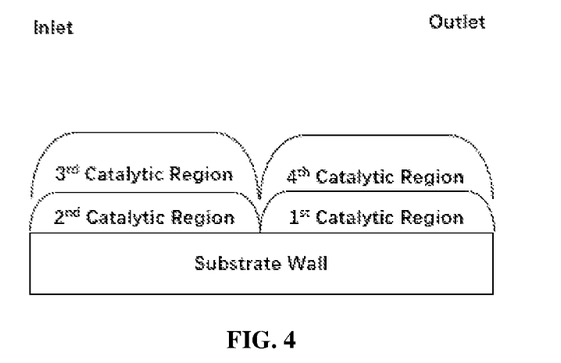

The third catalytic region can extend for 100 percent of the axial length L (e.g., see FIGS. 3b, 3c, and 3f). Alternatively, the third catalytic region can be less than the axial length L, for example, no greater than 95%, 90%, 80%, or 70% of the axial length L (e.g., see FIGS. 3a, 3d, 3e, 3g, and 4). In some embodiments, the third catalytic region can begin at the outlet end. In other embodiments, the third catalytic region can begin at the inlet end.

Fourth Catalytic Region

The catalytic article may further comprise a fourth catalytic region.

The fourth catalytic region can further comprise a fourth PGM component, a fourth oxygen storage capacity (OSC) material, a fourth alkali or alkaline earth metal component, and/or a fourth inorganic oxide.

The fourth PGM component can be selected from the group consisting of platinum, palladium, rhodium, and a mixture thereof. In some embodiments, the fourth PGM component can be Pd, Rh or a mixture thereof.

The fourth catalytic region may have the same or similar composition as the third catalytic region.

The fourth catalytic region can be less than the axial length L, for example, no greater than 95%, 90%, 80%, or 70% of the axial length L.

Alternatively, either of fourth or the third catalytic region can extend for 30 to 70 percent of the axial length L. Preferably, for 40 to 60 percent, more preferably, 45 to 55 percent of the axial length L. and most preferably, the total length of the fourth and the third catalytic region is equal or greater than the axial length L (e.g., see FIG. 4).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith.

The substrate can be less than 200 mm in length, preferably from 60 to 160 mm.

The flow-through monolith substrate has a first face and a second face defining a longitudinal direction therebetween. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metalloid aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

Another aspect of the present disclosure is directed to a method for treating a vehicular exhaust gas from CNG engine containing $NO_x$, CO, HC (methane), and ammonia using the catalyst article described herein. The testing catalysts made according to this method show improved catalytic properties compared to conventional TWC (with the same or similar PGM loading), also show especially improved performance in ammonia emission control under wide lambda range (e.g., see Examples 1-2; and Tables 2-6).

Another aspect of the present disclosure is directed to a system for treating vehicular exhaust gas comprising the catalyst article described herein in conjunction with a conduit for transferring the exhaust gas through the system. In some embodiments, the system does not comprise an ammonia slip catalyst (ASC).

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from the known suppliers, unless noted otherwise.

Catalyst 1 (Comparative)

Figure 1:
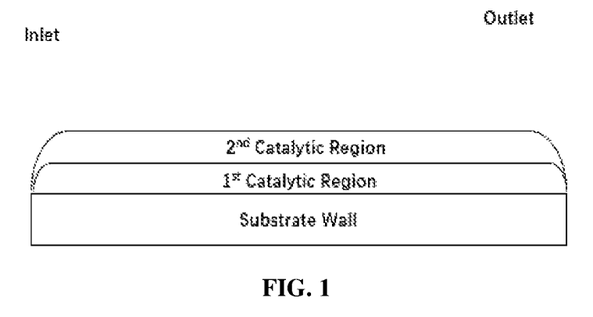
FIG. 1 shows configuration of Comparative Catalysts 1 and 4, where the first catalytic region extends 100% of the axial length L, as bottom layer; the second catalytic region extends 100% of the axial length L, as top layer.

Catalyst 1 is a typical three-way (Pd—Rh) catalyst with a double-layered structure in two catalytic regions as shown in FIG. 1. Bottom layer consists of Pd supported on a washcoat of a first CeZr mixed oxide, La-stabilized alumina, Ba promotor. The washcoat loading of the first catalytic region was about 2.2 $g/in^3$ with a Pd loading of 128 $g/ft^3$. The washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Top layer consists of Rh supported on a washcoat of a second CeZr mixed oxide, La-stabilized alumina. The washcoat loading of the second layer was about 1.3 $g/in^3$ with a Rh loading of 7 $g/ft^3$. This second washcoat was then coated from each end face of the ceramic substrate containing the bottom layer from above, using standard coating procedures with coating depth targeted of 50% of the substrate length, dried at 100° C. and calcined at 500° C. for 45 mins.

Catalyst 2 (Comparative)

Figure 2A:
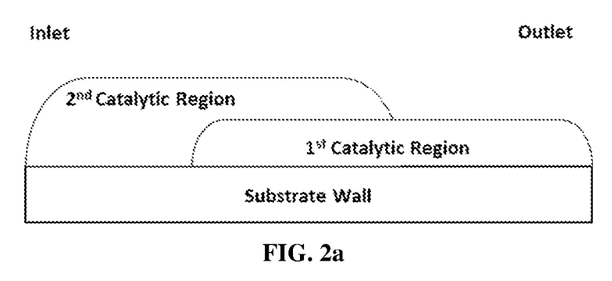
FIG. 2a shows one embodiment according to the present invention, the first catalytic region extends less than 100% of the axial length L, from the outlet end; the second catalytic region extends less than 100% of the axial length L, from the inlet end. The total length of the second and the first catalytic region is greater than the axial length L.
Figure 2B:
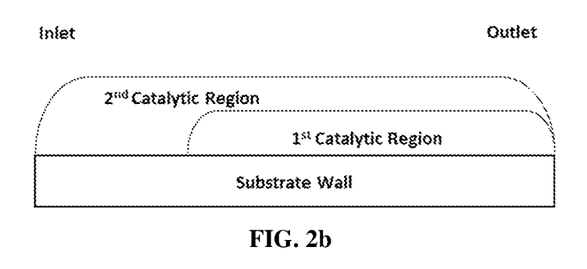
FIG. 2b shows one embodiment according to the present invention, the first catalytic region extends less than 100% of the axial length L, from the inlet end; the second catalytic region extends 100% of the axial length L, from the outlet end. The total length of the second and the first catalytic region is greater than the axial length L.
Figure 2C:
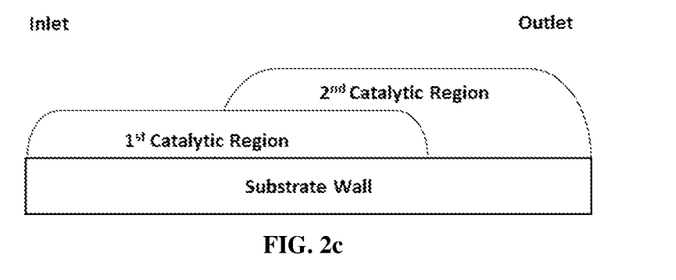
FIG. 2c shows configuration of Comparative Catalyst 3, where the first catalytic region extends less than 100% of the axial length L, from the inlet end; the second catalytic region extends less than 100% of the axial length L, from the outlet end. The total length of the second and the first catalytic region is greater than the axial length L.
Figure 2D:
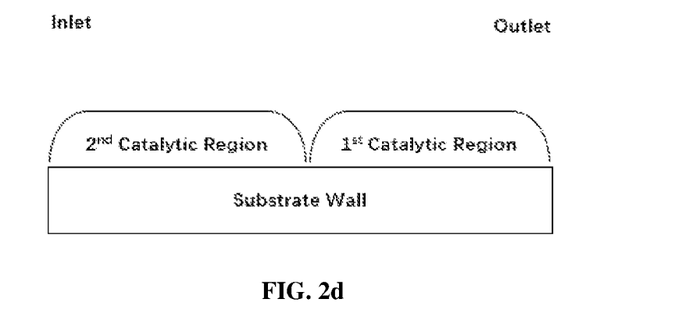
FIG. 2d shows one embodiment according to the present invention, the first catalytic region extends less than 100% of the axial length L, from the outlet end; the second catalytic region extends less than 100% of the axial length L, from the inlet end. The total length of the second and the first catalytic region is equal or less than the axial length L.
Figure 2E:
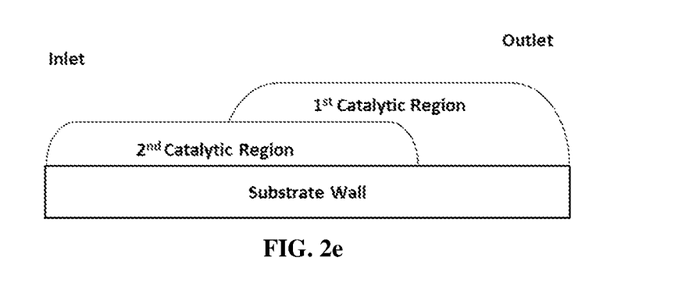
FIG. 2e shows one embodiment according to the present invention, the second catalytic region extends less than 100% of the axial length L, from the inlet end; the first catalytic region extends 100% of the axial length L, from the outlet end. The total length of the second and the first catalytic region is greater than the axial length L and the first catalytic region partially covers the second catalytic region.

First Catalytic Region:

Catalyst 2 is a three-way (Pd—Rh) catalyst with two catalytic regions as shown in FIG. 2c. The first catalytic region beginning at the inlet end which consists of Pd supported on a washcoat of a first CeZr mixed oxide, La-stabilized alumina, Ba promotor. The washcoat loading of the first region was about 2.2 $g/in^3$ with a Pd loading of 128 $g/ft^3$.

This washcoat was then coated from the inlet face of a ceramic substrate (400 cpsi, 4.3 mil wall thickness) using standard coating procedures with coating depth targeted of 80% of the substrate length, dried at 100° C.

Second Catalytic Region:

The second catalytic region beginning at the outlet end which consists of Rh supported on a washcoat of a second CeZr mixed oxide, La-stabilized alumina. The washcoat loading of the second region was about 1.3 $g/in^3$ with a Rh loading of 7 $g/ft^3$.

This second washcoat was then coated from the outlet end face of the ceramic substrate containing the first catalytic region from above, using standard coating procedures with coating depth targeted of 80% of the substrate length, dried at 100° C. and calcined at 500° C. for 45 mins.

Catalyst 3

First Catalytic Region:

Catalyst 3 was prepared according to the present invention with two catalytic regions, as shown in FIG. 2a. The first catalytic region beginning at the outlet end which consists of Pd supported on a washcoat of the first CeZr mixed oxide, La-stabilized alumina, Ba promotor. The washcoat loading of the first region was about 2.2 $g/in^3$ with a Pd loading of 128 $g/ft^3$.

This washcoat was then coated from the outlet face of a ceramic substrate (400 cpsi, 4.3 mil wall thickness) using standard coating procedures with coating depth targeted of 80% of the substrate length, dried at 100° C.

Second Catalytic Region:

The second catalytic region beginning at the inlet end consists of Rh supported on a washcoat of a second CeZr mixed oxide, La-stabilized alumina. The washcoat loading of the second region was about 1.3 g/in$^3$ with a Rh loading of 7 g/ft$^3$.

This second washcoat was then coated from the inlet end face of the ceramic substrate containing the first catalytic region from above, using standard coating procedures with coating depth targeted of 80% of the substrate length, dried at 100° C. and calcined at 500° C. for 45 mins.

Catalyst 4 (Comparative)

First Catalytic Region:

Catalyst 4 is a commercial three-way (Pd—Rh) catalyst with two catalytic regions in a double-layered structure as shown in FIG. 1. The first catalytic region as the bottom layer consists of Pd supported on a washcoat of a first CeZr mixed oxide, La-stabilized alumina, Sr promotor. The washcoat loading of the bottom layer was about 2.2 g/in$^3$ with a Pd loading of 124 g/ft$^3$.

This washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Second Catalytic Region:

The second catalytic region as top layer consists of Rh supported on a washcoat of a second CeZr mixed oxide, La-stabilized alumina. The washcoat loading of the top layer was about 1.3 g/in$^3$ with a Rh loading of 7 g/ft$^3$.

This second washcoat was then coated from each end face of the ceramic substrate containing the first catalytic region from above, using standard coating procedures with coating depth targeted of 50% of the substrate length, dried at 100° C. and calcined at 500° C. for 45 mins.

Example 1—Improved Catalyst Performance

Catalyst performance testing were performed on Comparative Catalyst 1, Comparative Catalyst 2, and Catalyst 3 under the following conditions using a simulated exhaust gas having the composition shown in Table 1.

TABLE 1

Simulated Gas Composition for the Performance Test

| $O_2$ (%) | $H_2O$ (%) | $CO_2$ (%) | CO (%) | $CH_4$ (ppm) | NO (ppm) | $H_2$ (%) | $N_2$ |
|---|---|---|---|---|---|---|---|
| 0.6 | 5 | 8 | 0.75 | 1500 | 1400 | 0.24 | Balance |

In the catalyst performance testing, the gas flow rate was set at a spatial velocity of 60,000/hr, the temperature was 430° C., and the gas composition was analyzed after passing through the catalyst and the ammonia emission and the conversion rate were measured. The lower ammonia emission and the higher conversion rate mean the better catalytic performance. Lambda value was controlled by adjusting the $O_2$ concentration and Lambda was 0.994 when $O_2$ concentration was 0.6%, which is calculated based on the traditional method. Comparative Catalyst 1, Comparative Catalyst 2, and Catalyst 3 were oven aged for 100 hours at 950° C. with 10% $H_2O$ in air.

TABLE 2

SCAT Ammonia Emission results under different lambda values

| | $NH_3$ emission (ppm) | | |
|---|---|---|---|
| | Lambda = 0.971 | Lambda = 0.985 | Lambda = 0.994 |
| Comparative Catalyst 1 | 998 | 591 | 230 |
| Comparative Catalyst 2 | 998 | 637 | 254 |
| Catalyst 3 | 557 | 159 | 137 |

TABLE 3

SCAT $NO_x$ Conversion results under different lambda values

| | $NO_x$ conversion (%) | | | |
|---|---|---|---|---|
| | Lambda = 1.003 | Lambda = 1.011 | Lambda = 1.020 | Lambda = 1.033 |
| Comparative Catalyst 1 | 20.1 | 8.0 | 5.7 | 5.6 |
| Comparative Catalyst 2 | 26.5 | 5.7 | 3.5 | 3.4 |
| Catalyst 3 | 38.9 | 21.8 | 13.6 | 9.7 |

TABLE 4

SCAT $CH_4$ Conversion results under different lambda values

| | $CH_4$ conversion (%) | | | |
|---|---|---|---|---|
| | Lambda = 1.011 | Lambda = 1.020 | Lambda = 1.033 | Lambda = 1.046 |
| Comparative Catalyst 1 | 9.3 | 11.1 | 13.1 | 16.9 |
| Comparative Catalyst 2 | 12.2 | 14.3 | 17.5 | 22.5 |
| Catalyst 3 | 20.5 | 24.7 | 29.6 | 34.7 |

As shown in Table 2, Catalyst 3 showed significantly improved ammonia emission control performance through the PGM layering structure optimization (e.g., see the ammonia emission related to the lambda at 0.985, from 591 ppm and 637 ppm to 159 ppm), with 73% and 75% ammonia reduction respectively, when compared with Comparative Catalysts 1 and 2. Catalyst 3 also exhibited improved performance on $NO_x$ and $CH_4$ as shown in Table 3 and Table 4, the conversion of $NO_x$ and $CH_4$ improved significantly, when compared with Comparative Catalysts 1 and 2.

Example 2—Improved Catalyst Performance

Catalyst performance testing were performed on Catalyst 3 and Comparative Catalyst 4 and under the conditions using a simulated exhaust gas having the composition as shown in Table 1.

In the catalyst performance testing, the gas flow rate was set at a spatial velocity of 60,000/hr, the temperature was 550° C., and the gas composition was analyzed after passing through the catalyst and the ammonia emission and the conversion rate were measured. Lambda is controlled by adjust the $O_2$ concentration. Catalyst 3 and Comparative Catalyst 4 were oven aged for 100 hours at 950° C. with 10% $H_2O$ in air.

TABLE 5

SCAT Ammonia Emission results under different lambda values

| | NH₃ emission (ppm) | | |
|---|---|---|---|
| | Lambda = 0.953 | Lambda = 0.963 | Lambda = 0.971 |
| Catalyst 3 | 289 | 135 | 40 |
| Comparative Catalyst 4 | 786 | 502 | 76 |

TABLE 6

SCAT CH₄ Conversion results under different lambda values

| | CH₄ conversion (%) | | | |
|---|---|---|---|---|
| | Lambda = 0.953 | Lambda = 0.963 | Lambda = 0.971 | Lambda = 0.985 |
| Catalyst 3 | 9.9 | 18.3 | 35.6 | 63.3 |
| Comparative Catalyst 4 | 4.3 | 7.8 | 15.2 | 27.9 |

As shown in Table 5, Catalyst 3 exhibited significantly lower ammonia emission than Comparative Catalyst 4 (e.g., see the ammonia emission related to the lambda at 0.963, from 502 ppm to 135 ppm), decreased 73% as for ammonia emission. Catalyst 3 also exhibited significantly improved performance on CH₄ conversion, as shown in Table 6.

We claim:

1. A catalyst article for treating exhaust gas from compressed natural gas (CNG) engine comprising:
   a substrate comprising an inlet end, an outlet end with an axial length L;
   a first catalytic region beginning at the outlet end and extending for less than the axial length L, wherein the first catalytic region comprises a first PGM component; and
   a second catalytic region beginning at the inlet end, wherein the second catalytic region comprises a second PGM component;
   wherein the first PGM component comprises palladium, platinum, or a combination thereof;
   wherein the second PGM component comprises rhodium; and
   wherein the second catalytic region overlaps with the first catalytic region for 40 to 80 percent of the axial length L.

2. The catalyst article of claim 1, wherein the first catalytic region extends for 40 to 99 percent of the axial length L.

3. The catalyst article of claim 1, wherein the second catalytic region is essentially free of PGM metals other than rhodium.

4. The catalyst article of claim 1, wherein the second catalytic region comprises up to 25 g/ft³ of rhodium.

5. The catalyst article of claim 1, wherein the first catalytic region further comprises rhodium.

6. The catalyst article of claim 1, wherein the first PGM component comprises palladium.

7. The catalyst article of claim 6, wherein the first catalytic region comprises 0.1-300 g/ft³ of palladium.

8. The catalyst article of claim 1, wherein the first catalytic region further comprises a first oxygen storage capacity (OSC) material, a first alkali or alkaline earth metal component, and/or a first inorganic oxide.

9. The catalyst article of claim 1, wherein the second catalytic region further comprises a second oxygen storage capacity (OSC) material, a second alkali or alkaline earth metal component, and/or a second inorganic oxide.

10. The catalyst article of claim 9, wherein the second catalytic region is substantially free of the second alkali or alkaline earth metal.

11. The catalyst article of claim 1, further comprising a third catalytic region.

12. The catalyst article of claim 11, wherein the third catalytic region beginning at the outlet end and extending for less than the axial length L.

13. The catalyst article of claim 1, wherein the first catalytic region is supported/deposited directly on the substrate.

14. The catalyst article of claim 1, wherein the second catalytic region is supported/deposited directly on the substrate.

15. An emission treatment system for treating a flow of a CNG engine exhaust gas comprising the catalyst article of claim 1.

16. A method of treating an exhaust gas from a CNG engine comprising contacting the exhaust gas with the catalyst article of claim 1.

17. A catalyst article for treating exhaust gas from compressed natural gas (CNG) engine comprising:
   a substrate comprising an inlet end, an outlet end with an axial length L;
   a first catalytic region beginning at the outlet end and extending for less than the axial length L, wherein the first catalytic region comprises a first PGM component; and
   a second catalytic region beginning at the inlet end, wherein the second catalytic region comprises a second PGM component;
   wherein the first PGM component comprises palladium, platinum, or a combination thereof;
   wherein the second PGM component comprises rhodium; and
   wherein the first catalytic region further comprises rhodium.

18. The catalyst article of claim 17, wherein the second catalytic region overlaps with the first catalytic region.

19. A catalyst article for treating exhaust gas from compressed natural gas (CNG) engine comprising:
   a substrate comprising an inlet end, an outlet end with an axial length L;
   a first catalytic region beginning at the outlet end and extending for less than the axial length L, wherein the first catalytic region comprises a first PGM component;
   a second catalytic region beginning at the inlet end, wherein the second catalytic region comprises a second PGM component; and
   a third catalytic region;
   wherein the first PGM component comprises palladium, platinum, or a combination thereof; and
   wherein the second PGM component comprises rhodium.

20. The catalyst article of claim 19, wherein the third catalytic region beginning at the outlet end and extending for less than the axial length L.

* * * * *